United States Patent [19]
Lund

[11] Patent Number: 6,159,253
[45] Date of Patent: Dec. 12, 2000

[54] THERMALLY FORMED TAB SLOTS IN A SEPARATOR FOR A SPIRALLY-WOUND ELECTROCHEMICAL CELL

[75] Inventor: Jeffrey S. Lund, Forest Lake, Minn.

[73] Assignee: Medtronic, Inc., Minneapolis, Minn.

[21] Appl. No.: 09/067,187

[22] Filed: Apr. 27, 1998

Related U.S. Application Data

[60] Provisional application No. 60/072,223, Jan. 7, 1998.

[51] Int. Cl.[7] .............................. H01M 2/18; H01M 10/12
[52] U.S. Cl. ........................................... 29/623.1; 429/136
[58] Field of Search ..................................... 429/129, 131, 429/136, 137, 139, 94; 29/623.1

[56] References Cited

U.S. PATENT DOCUMENTS

| | | |
|---|---|---|
| 2,928,888 | 3/1960 | Vogt . |
| 3,373,060 | 3/1968 | Gray . |
| 3,395,043 | 7/1968 | Shoeld . |
| 3,734,778 | 5/1973 | Huf et al. . |
| 4,000,351 | 12/1976 | Hug et al. ................... 429/94 |
| 4,051,304 | 9/1977 | Snook ......................... 429/94 |
| 4,184,012 | 1/1980 | Barrella ...................... 429/94 |
| 4,332,867 | 6/1982 | Tsuda et al. ................ 429/94 |
| 4,333,994 | 6/1982 | Urry ........................... 429/94 |
| 4,539,271 | 9/1985 | Crabtree ..................... 429/94 |
| 4,550,064 | 10/1985 | Yen et al. ................... 429/94 |
| 4,663,247 | 5/1987 | Smilanich et al. ......... 429/94 |
| 4,668,320 | 5/1987 | Crabtree ................... 156/192 |
| 4,709,472 | 12/1987 | Machida et al. ......... 29/623.1 |
| 4,830,940 | 5/1989 | Keister et al. ........... 429/94 X |
| 4,863,815 | 9/1989 | Chang et al. .............. 429/94 |
| 5,008,165 | 4/1991 | Schmöde .................... 429/94 |
| 5,017,442 | 5/1991 | Watanabe et al. .......... 429/94 |
| 5,053,297 | 10/1991 | Yamahira et al. ....... 429/223 X |
| 5,116,698 | 5/1992 | Sears ........................... 429/94 |
| 5,147,737 | 9/1992 | Post et al. ................... 429/94 |
| 5,180,642 | 1/1993 | Weiss et al. ................ 429/90 |
| 5,344,431 | 9/1994 | Merritt et al. ............. 607/29 |
| 5,439,760 | 8/1995 | Howard et al. ............ 429/94 |
| 5,486,215 | 1/1996 | Kelm et al. .............. 29/623.1 |

*Primary Examiner*—Maria Nuzzolillo
*Assistant Examiner*—Jonathan Crepeau
*Attorney, Agent, or Firm*—Thomas F. Woods; Harold R. Patton

[57] ABSTRACT

An electrochemical cell and electrode assembly are disclosed in which a separator having at least one thermally formed tab slot disposed therein is employed in conjunction with an alkali metal anode and a cathode assembly that are wound together in a unidirectional winding having substantially straight sides such that the winding will fit into a prismatic cell. The separator inhibits tearing or splitting of the material from which it is formed in the region of the tab slot. A tab connected to a current collector projects through the tab slot. The tab slots are formed by folding a separator material around a template, aligning the template with a slot guide, and applying heat to the separator material in the region of the slot(s).

8 Claims, 15 Drawing Sheets

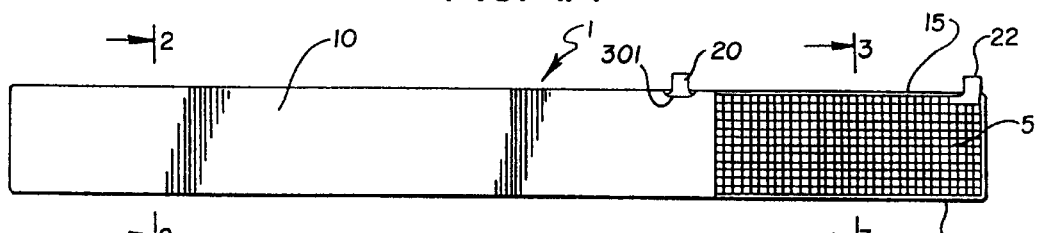
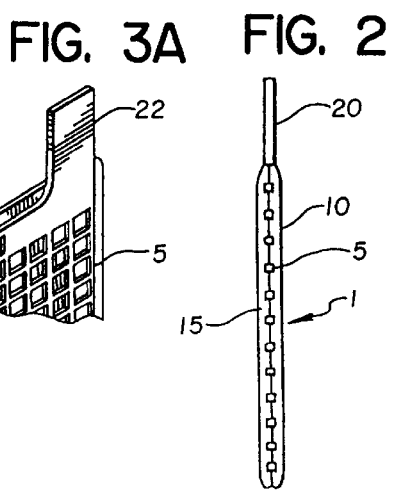
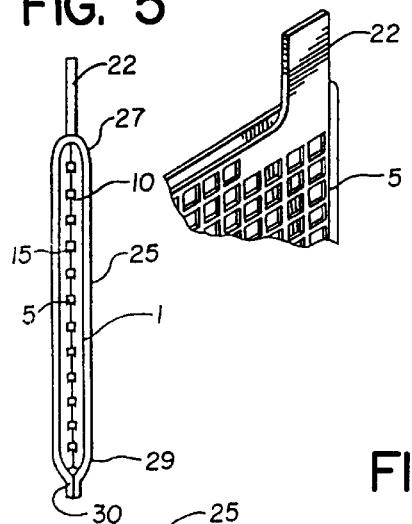
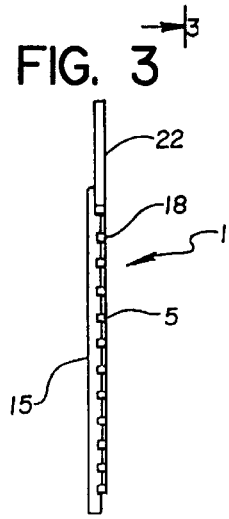
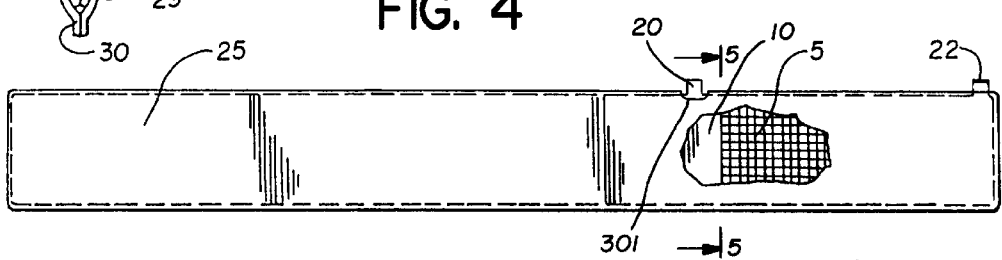
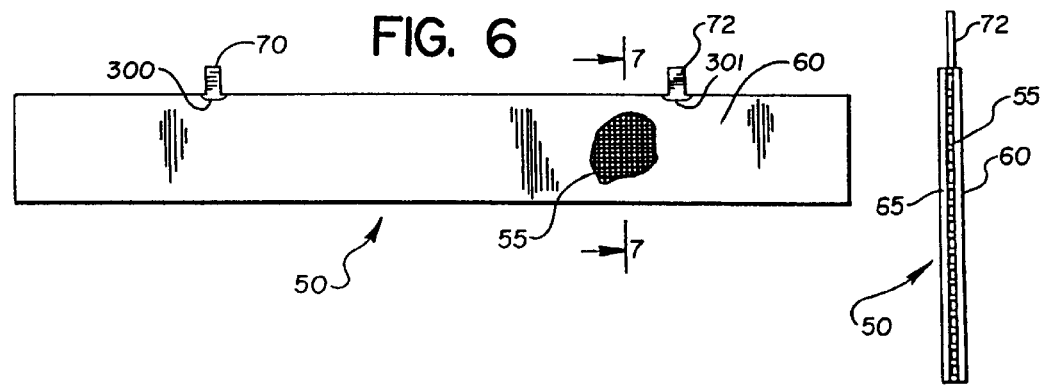

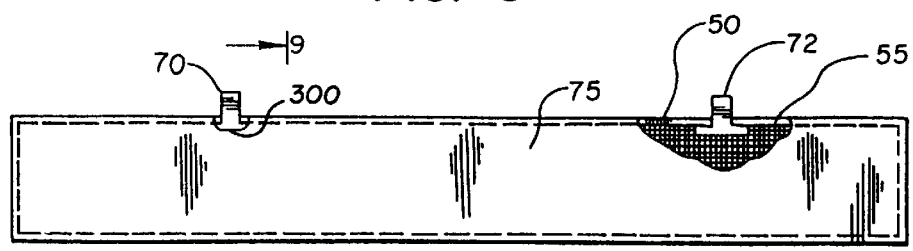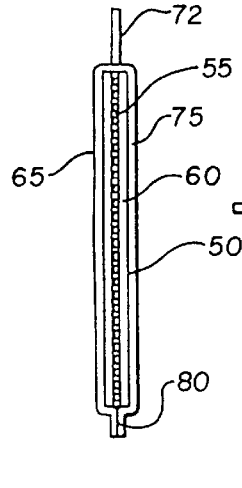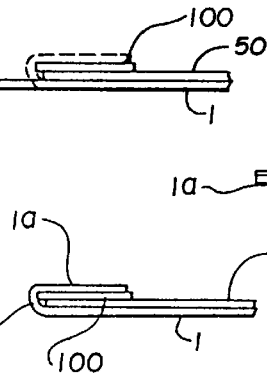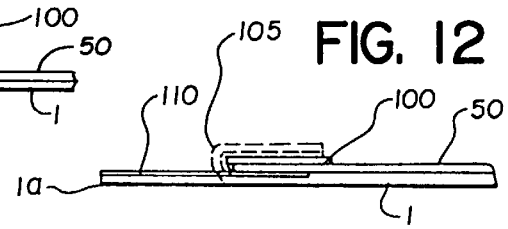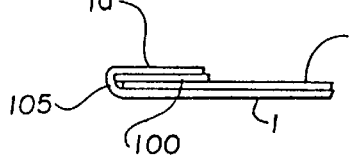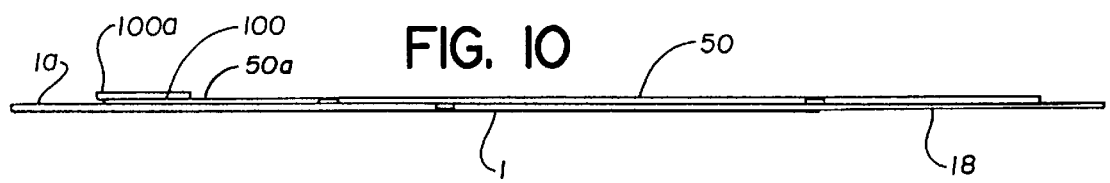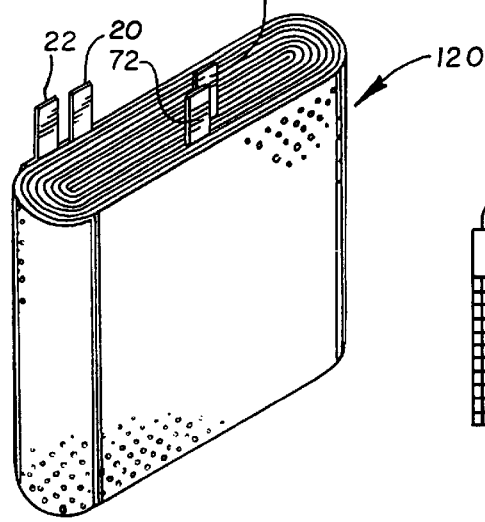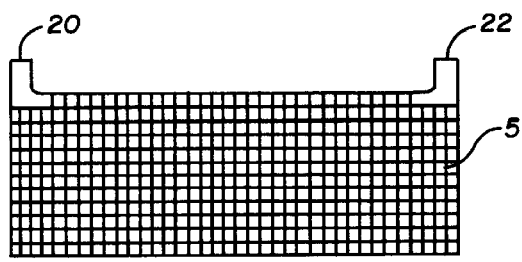

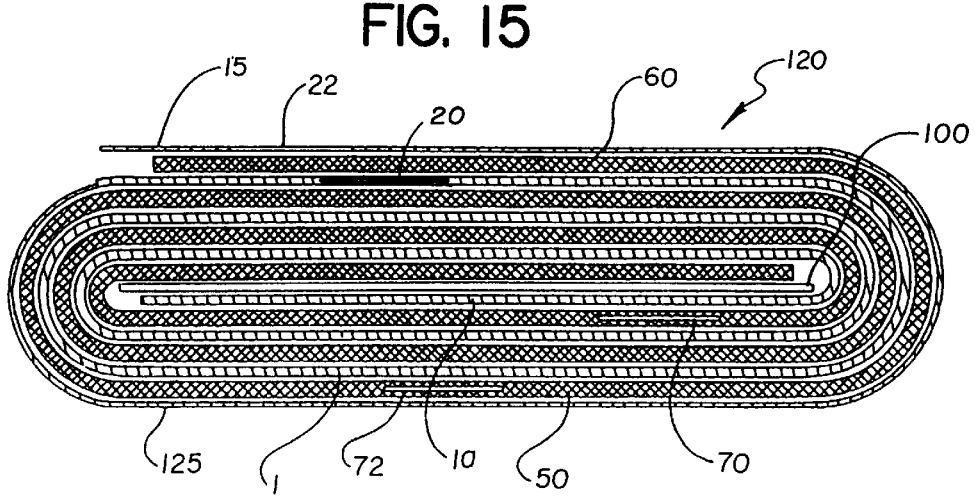
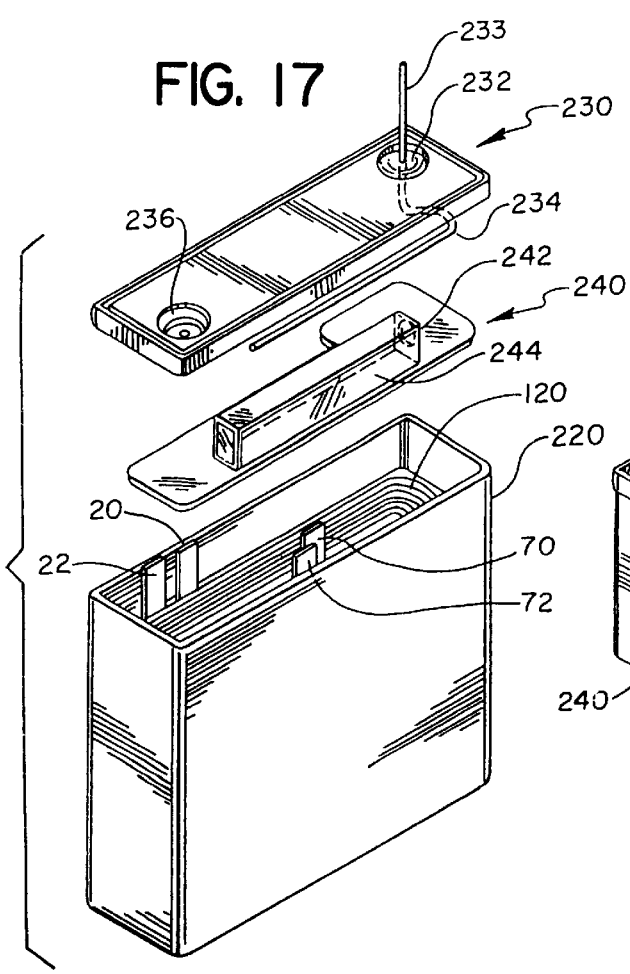
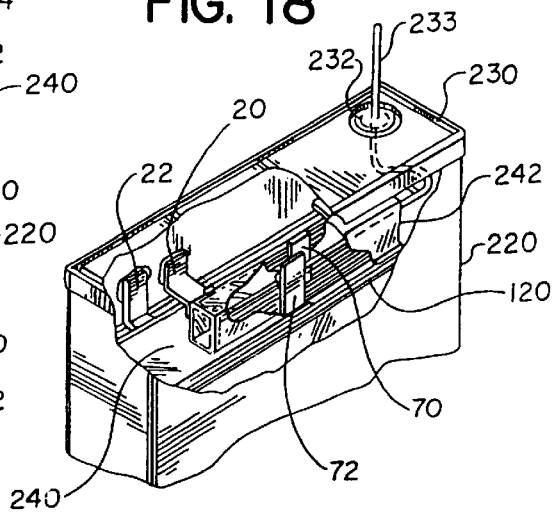

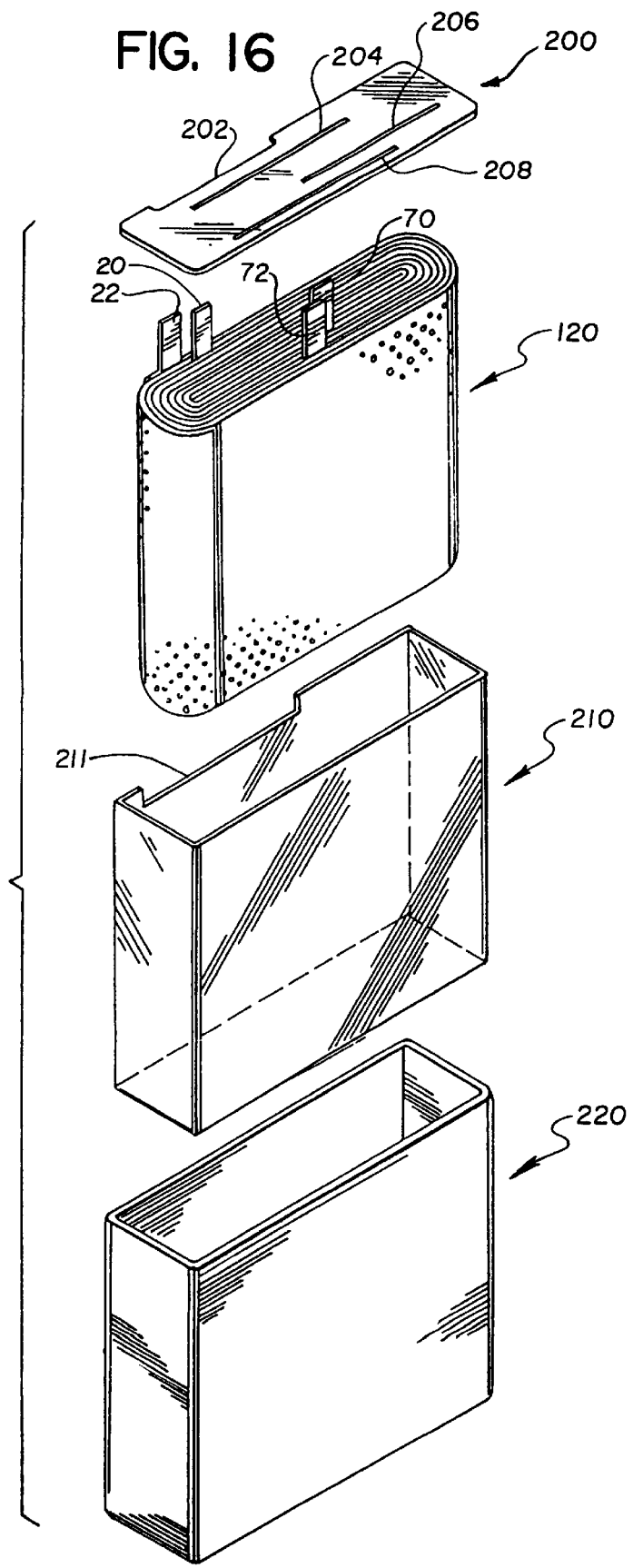

THERMALLY FORMED TAB SLOTS IN A SEPARATOR FOR A SPIRALLY-WOUND ELECTROCHEMICAL CELL

CROSS-REFERENCE TO RELATED APPLICATION

This application claims priority and other benefits from U.S. Provisional Patent Appln. Ser. No. 60/072,223 filed Jan. 7, 1998 for "Spirally Wound High Rate Electrochemical Cell" to Howard et al, and hereby incorporates by reference herein in its entirety such application.

FIELD OF THE INVENTION

This invention relates to separators for electrochemical cells, and more particularly to electrochemical cells comprising separators having thermally-formed tab slots disposed therein.

BACKGROUND OF THE INVENTION

This invention relates to electrochemical cells having a lithium anode, and more particularly to primary or secondary electrochemical cells having a lithium anode and corresponding current collector and separator adapted for high reliability and high rates of current discharge.

Implantable cardiac defibrillators are used to treat patients suffering from ventricular fibrillation, a chaotic heart rhythm that can quickly result in death if not corrected. In operation, the defibrillator device continuously monitors the electrical activity of the heart of the patient, detects ventricular fibrillation, and in response to that detection, delivers appropriate shocks to restore a normal heart rhythm. Shocks as large as 30–40 joules may be needed. Shocks are delivered from capacitors capable of providing that energy to the patient in a fraction of a second. In order to provide timely therapy to the patient after the detection of ventricular fibrillation, it is necessary to charge the capacitors with the required amount of energy in only a few seconds. Thus, the power source must have a high rate capability to provide the necessary charge to the capacitors, it must also possess low self-discharge in order to have a useful life of many months, and it must be highly reliable to provide an urgently needed therapy whenever necessary. In addition, since cardiac defibrillators are implanted, the battery must be able to supply energy from a minimum packaged volume.

One battery suitable for defibrillator use is disclosed in U.S. Pat. No. 4,830,940 to Keister et al, which patent is incorporated herein by reference. As disclosed therein, the anode material of the battery is lithium and the reactive cathode material is silver vanadium oxide. The anode is constructed in a serpentine-like fashion with cathode plates inserted between each of the convolutions thereof on both sides thereof. The electrolyte for a lithium battery or cell is a liquid organic type which comprises a lithium salt and an organic solvent. Both the anode and the cathode plates are encapsulated in an electrically insulative separator material. However, a disadvantage such a battery design is that the serpentine anode is not efficiently used since anode material at the bends is not faced by cathode material and is therefore not fully utilized. An improvement which addresses this problem is disclosed in U.S. Pat. No. 5,147,737 to Post et al, in which the active material on the serpentine-type electrode is positioned so that the sections of the serpentine-like structure which do not face cathode plates do not contain anode active material. However, the serpentine bends of the anode are still present to the detriment of volumetric efficiency. Additional problems with these battery designs include the number of piece parts and connections required to make the battery which can affect both the manufacturability and the reliability of the battery; and the difficulty of achieving good current distribution and utilization of reactive material due to the unmatched configurations of the anode and cathode.

Conventional lithium batteries can also employ an electrode body in which anode and cathode elements are combined in spiral wound form. A strip sheet of lithium or lithium alloy comprises the anode, a cathode material supported on a charge collecting metal screen comprises the cathode, and a sheet of non-woven material separates the anode and cathode elements. These elements are combined and wound to form a spiral. Typically, the battery configuration for such a wound electrode would be cylindrical. For example, such configurations may be found in U.S. Pat. Nos. 3,373,060; 3,395,043; 3,734,778; 4,000,351; 4,184,012; 4,332,867; 4,333,994; 4,539,271; 4,550,064; 4,663,247; 4,668,320; 4,709,472; 4,863,815; 5,008,165; 5,017,442, and 5,053,297. Unlike the battery of the '940 patent, the anode material need not be mated to cathode material. Such designs therefore have the potential for an improved match between the cathode and anode components and improved uniformity of anode and cathode utilization during discharge. Cylindrical cells, however, typically cannot achieve the same space utilization inside the case of an implantable defibrillator as a cell of prismatic shape.

It has also been known to adapt wound electrodes to a prismatic case configuration by departing from a true spiral winding. For example, U.S. Pat. No. 2,928,888 discloses in FIGS. 5a and 5b thereof an oblong electrode assembly wound on an elongated mandrel for use in a rectangular case. Also, for example, U.S. Pat. No. 4,051,304 discloses in FIG. 2 thereof another oblong wound electrode assembly for use in a rectangular case. However, those patents do not indicate that such structures could be advantageously used for a high current rate capability lithium battery or that they provide a uniform utilization of reactive anode and cathode material during discharge.

SUMMARY OF THE INVENTION

The present invention has certain objects. That is, the present invention provides solutions to at least some of the problems existing in the prior art respecting high reliablity electrochemical cells for implantable medical device applications. More particularly, it is an object of the present invention to provide a separator formed of thin material that is less prone to the uncontrolled or undesired splitting or tearing relatively common in separators having current collector tab slots formed therein by cutting or knife means. does not tear or high current rate capability lithium battery having a coiled electrode suitable for use in a prismatic case.

Certain embodiments of the present invention have certain advantages, including one or more of the following: (a) reduction in battery manufacturing costs; (b) increases in battery reliability; and (c) reduction in tearing or splitting of separators initiating at the site of a current collector tab slot.

Certain embodiments of the present invention have certain features, including at lest one of the following: (a) a thermally-formed tab slot in a separator; (b) a thermally-formed tab slot in a separator having a thermally-formed bead disposed about the periphery thereof; (c) a separator having at least one thermally formed tab slot disposed therein; (d) a separator which are not prone to tearing or splitting in the region of at least one thermally formed tab slot disposed therein; (e) a separator having multiple thermally formed tab slots disposed therein; (f) a separator having thermally-formed tab slots disposed therein for receiving at least one current collector tab attached to a shortened electrode current collector; (g) a high-rate spirally-wound electrochemical cell having at least one of an anode assembly and a cathode assembly disposed in or propinquant to a separator having at least one thermally-formed tab slot disposed therein, and (h) methods of making and using a separator having at least one thermally formed tab slot disposed therein.

These and other objects, features and advantages provided by the present invention will become apparent upon reading the specification, drawings and claims appended hereto.

BRIEF DESCRIPTION OF THE DRAWINGS

FIG. 1A shows a side view of an anode component employed in the present invention.

FIG. 1B shows a side view of current collector 5 of the anode component of FIG. 1A.

FIG. 2 shows a cross sectional view of a first portion of the anode of FIG. 1A.

FIG. 3 shows a cross sectional view of a second portion of the anode of FIG. 1A.

FIG. 3A shows a detailed view of the electrode tab of the anode of FIG. 1A.

FIG. 4 shows a partially cut-away side view of a combined anode and separator employed in the present invention.

FIG. 5 shows a cross sectional view of the anode and separator of FIG. 4.

FIG. 6 shows a partially cut-away side view of a cathode assembly employed in the present invention.

FIG. 7 shows a cross sectional view of the cathode assembly of FIG. 6.

FIG. 8 shows a partially cut-away side view of a combined cathode assembly and separator employed in the present invention.

FIG. 9 shows a cross sectional view of the combined cathode assembly and separator of FIG. 8.

FIG. 10 shows a top view of a mandrel, cathode assembly and anode assembly of the present invention ready to be wound.

FIG. 11 shows a top view of the end portion of the mandrel, cathode assembly and anode assembly of FIG. 10 showing the direction of the bend for the anode about the cathode and mandrel.

FIG. 12 shows a top view of the end portion of the mandrel, cathode assembly and anode assembly of FIG. 11 showing the use of additional separator material at the anode bend.

FIG. 13 shows a top view of the end portion of the mandrel, cathode assembly and anode assembly showing the completed bend from FIG. 11.

FIG. 14 shows a perspective view of a completed electrode assembly according to the present invention.

FIG. 15 shows a top view of the windings of an electrode assembly of the present invention, where separator material between the winding elements is not shown, and the position of the mandrel in the windings prior to its removal.

FIG. 16 shows an exploded perspective view of the insertion of an electrode assembly of the present invention into a battery case with insulator materials.

FIG. 17 shows an exploded perspective view of application of an insulator and case top to the case and electrode assembly of FIG. 16.

FIG. 18 shows a partial cut-away perspective view of a completed battery of the present invention and the connection of the tabs of an electrode with case elements.

DETAILED DESCRIPTION OF THE INVENTION

Figure 19:
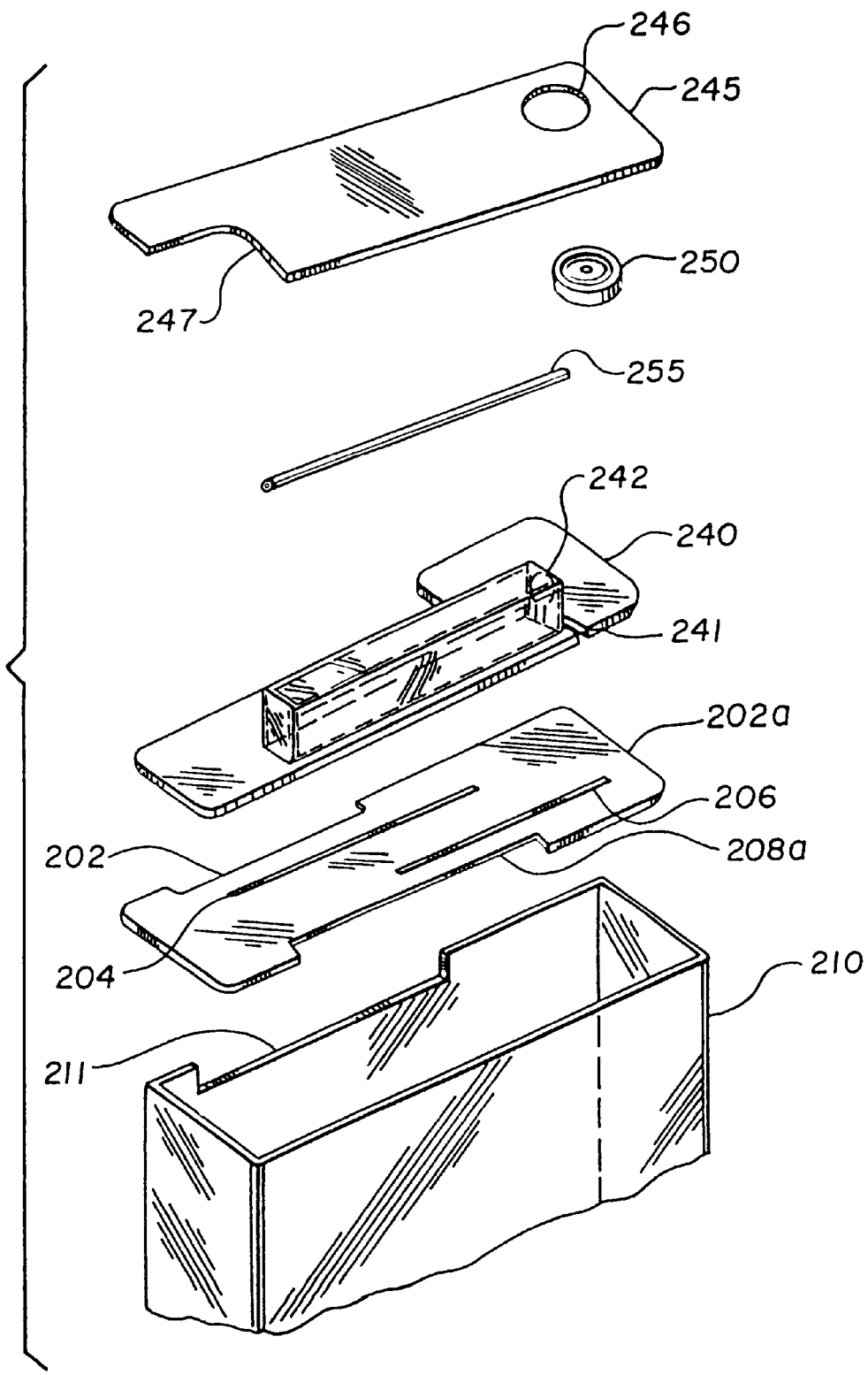
FIG. 19 shows a partial cut-away perspective view of isolation components for the battery of the present invention.

Referring now to the drawings, FIGS. 1A through 6 show the anode portion of the electrode assembly. In FIG. 1A, elongated anode assembly 1 is shown including current collector 5 having a first layer of alkali metal 10 on one side and a second layer of alkali metal 15 on the other side. Alkali metal layers 10 and 15 are most preferably formed from a lithium metal or alloy pressed onto the screen current collector 5. FIG. 1B shows a side view of shortened length current collector 5 of the anode assembly of FIG. 1, where tabs 20 and 22 project upwardly therefrom.

FIG. 2 shows a cross-sectional view of the sandwich structure of anode assembly 1 with current collector 5 interposed between first and second layers of alkali metal 10 and 15, respectively. FIG. 3 shows in cross section that anode assembly 1 has at one end 18 alkali metal layer 15 only on one side of current collector 5. A bare portion of current collector 5 most preferably forms the outer wrap of the wound electrode assembly since no active material is required for such surface.

Current collector 5 is an electrically-conductive metal that is corrosion-resistant when associated with the alkali metal 10, 15, and is most preferably formed of nickel, copper, an alloy of nickel or copper, or other transition metal or metal alloy that does not readily form an alloy with lithium such as iron, stainless steel and metals of or alloys formed from Group IB of the Periodic Table. First and second connector tabs 20, 22 most preferably project from the upper or lower edge of current collector 5, although a single connector tab may also be used since the conductivity of lithium metal on a current collector formed of suitable metal or alloy is capable of providing adequate current distribution at high discharge rates if the current collector has sufficient conductive cross sectional area for its length. Additional connector tabs may also be added if improved reliability of connections is desired.

Connector tabs 20 and 22 may also be incorporated into current collector 5 when formed as shown in FIG. 3A. The current collector 5 is preferably made by an etching process which provides smooth edges on the current collector 5 and thereby eliminates stray metal pieces which might otherwise poke through the separator material and cause shorting of the battery. An alternative to anode assembly 1 depicted in FIGS. 1 through 5 is to dispense with the current collector 5 in favor of an anode which is made up almost entirely of an alkali metal or alkali metal alloy. In such a configuration, the alkali metal would be formed in a thicker cross-section at one end than at another and the connector tabs would be connected directly to the alkali metal.

FIGS. 4 and 5 show anode assembly 1 covered by separator 25. Separator 25 forms a pocket around the anode assembly 1 since it folds over at the top edge 27 and conforms to the anode assembly 1 until it reaches the bottom edge 29 where it is joined to itself at a seal 30. Slits (not shown) can be cut in the separator 25 to allow the connector tabs 20, 22 to project through the separator 25. The material used in the separator 25 can be a commercially available microporous polyolefin (i.e. polyethylene or polypropylene) separator material such as CELGARD® 4560, or more preferably CELGARD® 2500 (microporous materials made by Hoechst Celanese). Preferably, the nonwoven side of separator 25 is pressed into the surface of alkali metal layers 10 and 15 of the anode assembly 1 such that the alkali metal deforms into intimate contact with the separator 25 and bonds to the separator 25.

This deformation bonding can be accomplished by pressing the nonwoven side of separator 25 onto alkali metal layers 10 and 15 in an hydraulic press, and may further be accomplished in the same pressing operation in which alkali metal layers 10 and 15 are pressed onto the current collector 5 as described above. In preparation for the pressing operation, alkali metal layers 10 and 15 are cut to size from appropriate sheets of anode material, weighed, and then placed on either side of the current collector 5 in a die. The die and anode components 5, 10 and 15 are then placed in a rolling fixture which presses alkali metal layers 10 and 15 onto the current collector at a pressure sufficient to hold them in place. The separator 25 is then placed around the anode assembly 1 and is pressed onto alkali metal layers 10 and 15 on anode assembly 1 by an hydraulic press at a pressure such as 800 psi that deforms the anode metal into intimate contact with the separator. Seal 30 for separator 25 may be a heat seal made by conventional heat sealing equipment.

FIGS. 6 through 9 show elongated cathode assembly 50, which includes current collector 55 onto which layers 60 and 65 of a cathode material are pressed. Most preferably, cathode assembly 50 has essentially the same width as the anode assembly 1. The cathode material includes a solid reactive cathode ingredient such as manganese dioxide, $V_6O_{13}$, silver vanadium oxide, or $CF_x$, or mixtures or combinations thereof, and dry mixtures including such materials together with such binders and conductivity enhancers as may be desirable.

Preferably, the silver vanadium oxide employed is that disclosed in U.S. Pat. No. 5,221,453 issued to Crespi. For example, in a battery employing silver vanadium oxide as a reactive cathode ingredient, about 5% PTFE may be added as a binder along with about 2% carbon black and 2% graphite as conductivity enhancers. The particulate ingredients can be mixed together, dried to a desired moisture content, placed in a uniform layer over the current collector 55 and then dry pressed in a high pressure press to form each of the cathode material layers 60 and 65. Alternatively, wet processes known in the art could also be used in which a wet mix of cathode material is deposited on the current collector 55 and then dried and rolled to form each of the cathode material layers 60 and 65.

Connector tabs 70 and 72 project from the edge of the current collector 55 in substantially the same manner as in anode assembly 1 described above. Current collector 55 is a conductive metal that is corrosion-resistant when associated with the cathode material, preferably titanium, stainless steel or an alloy of titanium.

Separator 75 most preferably forms a pocket around cathode assembly 50 in the same manner as that for anode assembly 1 above, and is provided with seal 80. The material used to form separator 75 may be the same commercially available microporous polyolefin (i.e. polyethylene or polypropylene) separator material most preferably employed in anode assembly 1. Seal 80 may be formed using heat seal means. It is preferred that separator 75 for cathode assembly 50 be made slightly larger than cathode assembly 50 to allow for swelling of the cathode layers 60 and 65 as the battery is discharged and to keep the battery from splitting as it is discharged. This is in contrast to separator 25 for the anode assembly 1, which most preferably tightly fits around the circumference of anode assembly 1.

FIGS. 10 through 13 indicate how the winding process may be initiated. FIG. 10 shows how anode assembly 1 is most preferably aligned with cathode assembly 50 and mandrel 100 to commence the winding operation. Separators 25 and 75 for those components are in place around anode assembly 1 and cathode assembly 50, respectively, during the winding operation although they are not shown in FIGS. 10 through 13.

It should be noted that anode assembly 1 is longer than cathode assembly 50 and has been positioned such that end 1a overlaps corresponding end 50a of cathode assembly 50. End 50a of cathode assembly 50 has been positioned slightly behind edge 100a of mandrel 100. Anode assembly 1 has also been placed against cathode assembly 50 such that alkali metal layer 15 is pressed against cathode material layer 60 at end 18 of anode assembly 1 to ensure the outer winding of the electrode assembly has alkali metal layer 15 facing cathode material 60 and bare current collector 5 at end 18 faces outwardly.

As shown in FIGS. 11 and 13, the winding process is commenced by bending end 1a of anode assembly 1 onto mandrel 100. As shown, bend 105 also bends anode assembly 1 around the end of the cathode assembly. A minor to this bending procedure alternative (not shown in the Figures) that may find particularly efficacious use when making bend 105 by hand is to first bend anode assembly 1 over mandrel 100 in the absence of the cathode assembly 50 (but including a spacer of equivalent thickness to the cathode assembly 50 to make the proper bend radius on the anode assembly 1), and then remove the spacer and slip cathode assembly 50 between mandrel 100 and anode assembly 1.

It may be desirable to place additional separator material between anode assembly 1 and cathode assembly 50, and between anode assembly 1 and mandrel 100, to provide smoother bends. This may be accomplished as shown in FIG. 12, where additional separator material 110 has been placed over the anode assembly 1 and between anode assembly 1 and cathode assembly 50 at the point where bend 105 is to be made. A most convenient method for adding additional separator material 110 is to merely make separator 25 longer and extend separator 25 for anode assembly 1 beyond the length of anode assembly 1 at appropriate end 1a, and to simply fold separator 25 back along anode assembly 1, thereby providing a triple thickness of separator material at the point of bend 105.

The winding then most preferably proceeds by winding combined anode assembly 1 and cathode assembly 50 around mandrel 100 unidirectionally until the electrode assembly is completed. It is essential that the winding process be carried out by a method which will result in consistent winding tension. Uneven winding tension may cause higher and lower resistance paths during discharge and thereby produce uneven current distribution. Uneven winding tension may also result in the location of the connector tabs 20, 22, 70 and 72 being undesirably altered or moved in the final winding which may make establishing the necessary subsequent mechanical and electrical connections difficult. Even winding tension may be realized through careful hand winding or appropriate machine winding. Machine winding is preferred because it can produce greater battery-to-battery winding tension uniformity.

FIG. 14 shows completed electrode assembly 120 with connector tabs 20, 22, 70 and 72 projecting from electrode assembly 120. Most preferably, connector tabs 20 and 22 are disposed on one side of electrode assembly 120, while connector tabs 70 and 72 are spaced apart from anode connector tabs 20 and 22 on the opposite side of the electrode assembly as shown. Such a tab construction helps avoid inadvertent shorts in the completed battery. Additionally, it is preferred that connector tabs 20, 22, 70 and 72 be located such that they are positioned close to their intended connection point with the feedthrough or case and with no overlap between cathode tabs or anode tabs to facilitate the making of the individual welded connections.

FIG. 15 shows the final arrangement of the windings in one embodiment of electrode assembly 120 together with mandrel 100; note that separators 25 and 75 and current collectors 5 and 55 are not shown. Consistent winding of anode assembly 1 and cathode assembly 50 results in electrode assembly 120 in which mandrel 100 determines substantially the length of the straight sides of electrode assembly 120 and in which final anode layer 125 has alkali metal layer 15 only facing cathode material 60. As described above, current collector 5 may be eliminated altogether, substantially eliminated, shortened, or at least partially eliminated in the battery. Thus, for example, final anode layer 125 may be formed simply of anode material having half the thickness of the remainder of the anode.

Removal of the mandrel 100 brings first end 1a of anode assembly 1 into contact on both sides with cathode assembly 50 and completes electrode assembly 120. It will be appreciated that in order to provide close proximity between anode assembly 1 and cathode assembly 50 at the start of the winding that mandrel 100 is most preferably very thin. For example, a stainless steel mandrel about 0.010 inch thick may be used, although thicker mandrels may be employed if additional stiffness is desired or required.

As will be appreciated by those skilled in the art, the number of windings chosen for the battery will be determined by the required rate of discharge and the required capacity of the battery. Increasing the number of windings will provide an increased ability to discharge at a high rate but will tend to reduce the capacity per unit volume for the battery.

Assembly of electrode assembly 120 into a completed battery is shown in FIGS. 16 through 18. In FIG. 16, coil insulator 200 is placed onto electrode assembly 120. Coil insulator 200 includes notch 202 for accommodating anode connector tab 22 and slits 204, 206 and 208 for accommodating anode connector tab 20 and cathode connector tabs 70 and 72, respectively. Electrode assembly 120 is also inserted into insulative case liner 210. Case liner 210 preferably extends at its top edge above the edge of the electrode assembly 120 to provide an overlap with other insulative elements. If so, it may include notch 211 on one side in order to allow easy connection of anode connector tabs 20 and 22 to case 220. Coil insulator 200 and case liner 210 are most preferably formed from a polyolefin polymer or a fluoropolymer such as ETFE or ECTFE. Electrode assembly 120 and case liner 210 are then inserted into prismatic case 220, which is most preferably formed of stainless steel.

In FIG. 17, case cover 230 and pin insulator 240 are shown along with electrode assembly 120 and prismatic case 220. Case cover 230 most preferably includes glassed-in feedthrough 232 and feedthrough pin 233 extending through an aperture in case cover 230 having bend 234. Bend 234 places feedthrough 232 in alignment with cathode connector tabs 70 and 72. Case cover 230 also most preferably has fill port 236. Case cover 230 is most preferably formed from stainless steel. Feedthrough pin 233 is most preferably formed from niobium or molybdenum. Pin insulator 240 has aperture 242 leading into raised portion 244 for receiving feedthrough pin 233 and insulating feedthrough pin 233 from contact with case cover 230.

In combination with one side of coil insulator 200 (which is disposed immediately below pin insulator 240), the raised portion forms a chamber which isolates the cathode connections. Additional insulation in the form of tubing or a coating (not shown) may also be included on feedthrough pin 233 or feedthrough 232 at locations which are not welded to further insulate feedthrough pin 233 and feedthrough 232. An additional cover insulator (not shown) may also be applied to the underside of case cover 230 to provide additional insulation for case cover 230. Feedthrough pin 233 is most preferably welded to cathode connector tabs 70 and 72 as shown in FIG. 18. Anode connector tabs 20 and 22 are most preferably bent into an "L" shape as shown in FIG. 18 and welded to the side of case 220 to thereby make metal case 220 one terminal or contact for the battery (i.e. a case negative design). Feedthrough pin 233 is then inserted through a split (not shown) in the pin insulator 240 until it projects through aperture 242 of pin insulator 240. Electrode assembly 120 may located outside case 220 during some of the welding and bending operations. Naturally, all electrode welding operations should take place in an inert gas atmosphere. Case cover 230 is then welded to case 220 to seal electrode assembly 120 in the case.

FIG. 19 shows isolation components for the battery in greater detail. Cover insulator 245 is adapted to fit under case cover 230 with aperture 246 to accommodate feedthrough 232 and feedthrough pin 233. Cut-away portion 247 accommodates fill port 236. Cover insulator 245 is applied to the underside of case cover 230. Feedthrough insulator 250 then slides over feedthrough pin 233 and over feedthrough 232 into contact with cover insulator 245. Once feedthrough insulator 250 is in place, tubular insulator 255 is slipped over feedthrough pin 233 until it contacts the glass of feedthrough 232. Feedthrough pin 233 is then bent into its desired configuration for connection with cathode connector tabs 70 and 72 (as shown in FIG. 17).

Pin insulator 240 is shown with split 241 extending from the edge of pin insulator 240 to aperture 242. Pin insulator 240 has aperture 242 leading into raised portion or recess 244 for receiving feedthrough pin 233 and tubular insulator 255 over the feedthrough pin and insulating feedthrough pin 233 from contact with the case cover 230 at the point where feedthrough pin 233 is welded to cathode connector tabs 70 and 72. Split 241 allows pin insulator 240 to be placed on feedthrough pin 233 after feedthrough pin 233 has been welded to cathode tabs 70 and 72. Tubular insulator 255 therefore extends through aperture 242, thereby preventing any discontinuity in the isolation of the cathode connector tabs 70 and 72 and feedthrough pin 233 from elements at anode potential.

Coil insulator 202a is shown with a notch 202 to accommodate anode connector tab 22 and slits 204 and 206 to accommodate anode connector tab 20 and cathode connector tab 70, respectively. Notch 208a is also provided to accommodate cathode connector tab 72 in place of slit 208 shown in FIG. 16. Electrode assembly 120 is also inserted into insulative case liner 210. All case isolation components, including cover insulator 245, feedthrough insulator 250, tubular insulator 255, pin insulator 240, coil insulator 202a and case liner 210, are most preferably molded or extruded self-supporting polymeric parts made from, for example, polyolefin polymers or fluoropolymers such as ETFE or ECTFE. The result of such an insulator configuration is cathode connections that are thoroughly isolated electrically from portions of the battery at anode potential and a feedthrough connection that is thoroughly isolated from stray particles of cathode or anode material that may form as a result of battery discharge.

It will be appreciated that additional improvements to the foregoing insulator configuration may be achieved by improving the fit between insulative components to provide better isolation of anode and cathode elements. For example, aperture 242, pin insulator 240 and tubular insulator 255 may be sized to be tightly fitting components, or feedthrough pin 233 may be fitted with corresponding mating insulator parts for providing a snap fit to thereby reduce, obviate or eliminate migration of stray battery materials or particles through aperture 242.

Figure 20:
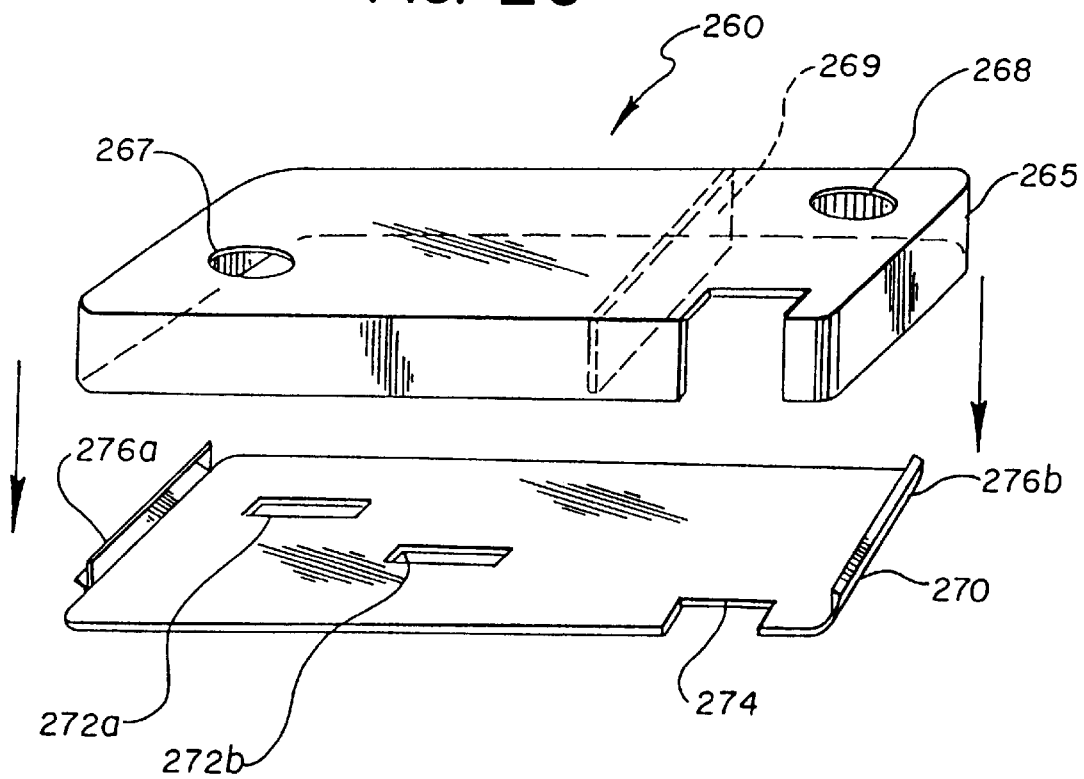
FIG. 20 shows a perspective view of an alternative embodiment of isolation components for the battery of the present invention.

Alternative configurations of the foregoing type may be similar to that shown in FIG. 20, where a perspective view of an alternative embodiment of isolation components for the battery of the present invention is shown. In FIG. 20, snap fit isolation system 260 is shown which reduces the number of isolation components in the battery. Snap fit isolation system 260 may comprise two principal components: top component 265 and bottom component 270, where components 265 and 270 are most preferably formed by injection molding means from an electrically insulative plastic or polymeric material. Components 265 and 270 may be employed to replace components 202a and 240, and optionally component 245 of FIG. 19.

Bottom component 270 most preferably includes apertures 272a and 272b for accommodating two cathode connector tabs and notch 274 (which, in turn, may accommodate an anode connector tab and also provide a passageway from fill port 236 into the remainder of the battery case to facilitate filling of the battery with electrolyte). Hooks 276a and 276b are adapted to mate with top component 265 to form a secure snap fit between top component 265 and bottom component 270.

Many alternative structures for forming a secure snap fit between components 265 and 270 are contemplated in the present invention, some of which are well known. Additionally, one of hooks 276a and 276b may be omitted in favor of a molded hinge for joining one edge of each of components 265 and 270 to one another. Top component 265 may include first aperture 267 for accommodating feedthrough pin 233 and second aperture 268 aligned with fill port 236 to allow electrolyte to be introduced in the battery through fill port 236.

Top component 265 may also include partition wall 269 which, when top and bottom components 265 and 270 are joined together, separate cathode connections, feedthrough pin 233 from fill port 236, an anode connection (only one anode tab is employed to connect the anode with the case in the embodiment shown in FIG. 20) from cathode connections, feedthrough pin 233 and other battery components. By joining components 265 and 270, a separate compartment is created to house feedthrough pin 233 and its connections with the cathode tabs.

Alternative embodiments of the present invention in which the battery is a case positive design or case neutral design can readily be constructed in like manner. For a case positive design, cathode connector tabs 70 and 72 may be rearranged for welding to case 220 while anode connector tabs 20 and 22 may be rearranged for welding to feedthrough pin 233. In a case neutral design, an additional feedthrough may be supplied that is connected to anode connector tabs 20 and/or 22.

Figure 21:
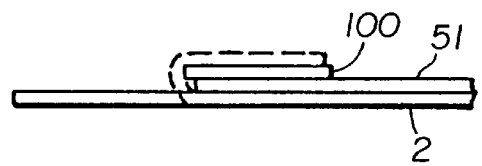
FIG. 21 shows a top view of the end portion of the mandrel, cathode assembly and anode assembly showing the direction of the bend for the cathode about the anode and mandrel.
Figure 22:
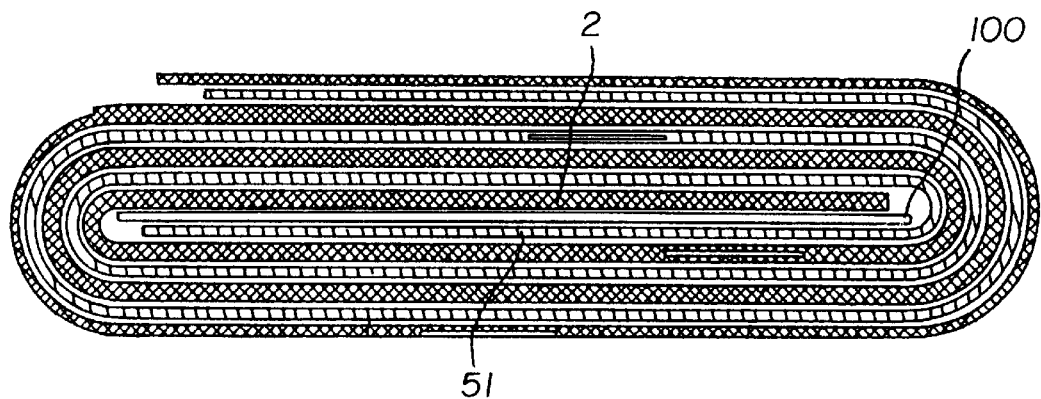
FIG. 22 shows a top view of the windings of the electrode assembly of FIG. 21, where the separator material between the winding elements is not shown, after the winding step has been completed, and the position of the mandrel in the windings prior to its removal.

As shown in FIGS. 21 and 22, yet another embodiment of the present invention may be constructed readily by exchanging the relative positions of the cathode and anode materials. FIG. 21 shows a top view of the end portion of the mandrel, cathode assembly 2 and anode assembly, and shows the direction of the bend for the cathode 51 about the anode and mandrel. FIG. 22 shows a top view of the windings of the electrode assembly of FIG. 21. In FIG. 22, the separator material between the winding elements is not shown, and the various battery elements are displayed after the winding step has been completed and with the mandrel positioned in the windings prior to its removal.

In such an alternative embodiment of the present invention, the electrode assembly configuration is reversed so that the cathode assembly is made longer than the anode assembly. A portion of the current collector only having cathode material on one side forms the outer layer of the winding, and the winding is initiated by bending the cathode assembly 2 over the mandrel. Other embodiments of the present invention described hereinabove, however, are generally preferred due to their superior rate capabilities and greater volumetric efficiencies.

An appropriate electrolyte solution is introduced through fill port 236 by a vacuum filling process, after which fill port 236 is sealed. The electrolyte solution may be an alkali metal salt in an organic solvent such as a lithium salt (e.g., 1.0M $LiClO_4$ or $LiAsF_6$) in a 50/50 mixture of propylene carbonate and dimethoxyethane. The sealing process (not shown in the Figures) may include, for example, making a first seal by pressing a plug into the aperture of fill port 236 and making a second seal by welding a cap or disc over fill port 236. As is well known in the art, a material for leak checking hermetic seals may be included between the first and second seals. Further details concerning spirally wound cells that may be adapted in accordance with the teachings of the present invention may be found in U.S. Pat. No. 5,439,760 to Howard et al. for "High Reliability Electrochemical Cell and Electrode Assembly Therefor," the disclosure of which is hereby incorporated by reference herein in its entirety.

Figure 23:
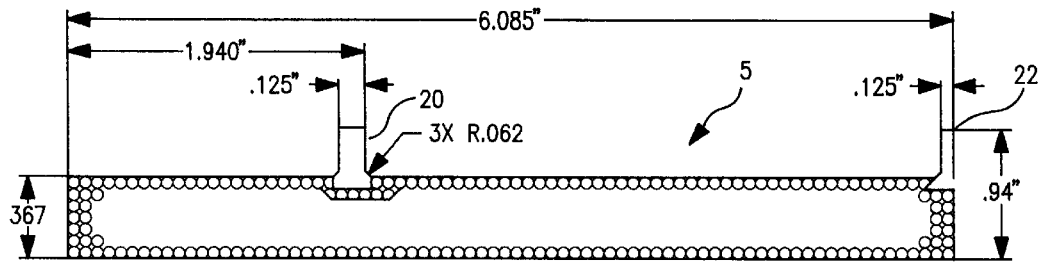
FIG. 23 shows a full-length anode current collector 5.
Figure 24A:
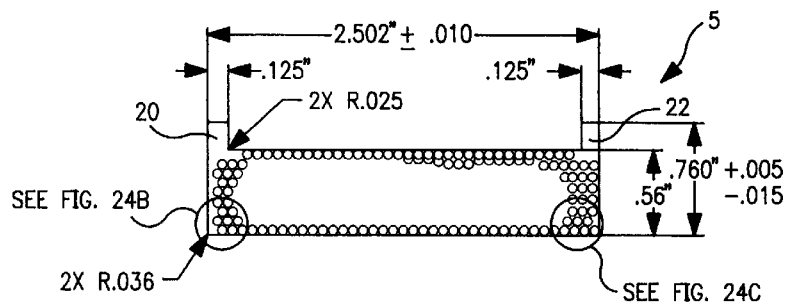
FIG. 24A shows one embodiment of a shortened anode current collector 5 of the present invention having two non-adjacent connector tabs 20.
Figure 24C:
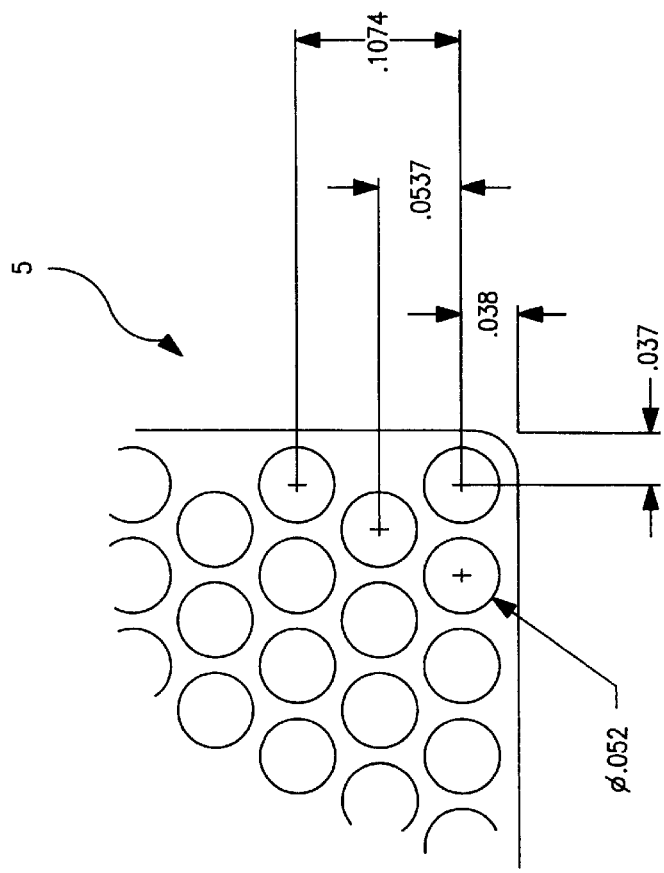
FIG. 24C shows a detailed view of the lower right-hand portion of anode current collector 5 shown in FIG. 24A.
Figure 24B:
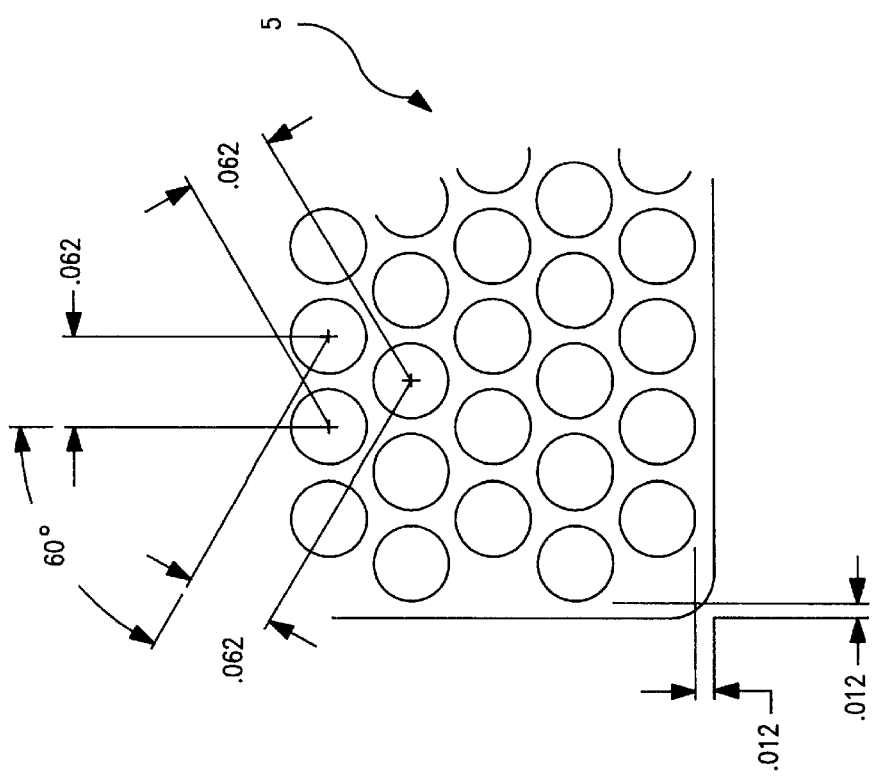
FIG. 24B shows a detailed view of the lower left-hand portion of anode current collector 5 shown in FIG. 24A.

FIG. 23 shows a full-length conventional anode current collector 5. FIGS. 24A through 24C show a shortened anode current collector 5 having two non-adjacent connector tabs 20, 22. FIG. 24A shows a side view of the entire anode current collector 5, while FIGS. 24B and 24C show details of a preferred grid pattern at two end portions of current collector 5.

Cells of the present invention are most preferably constructed using relatively thin CELGARD® 2500 separators, silver vanadium oxide cathode compositions, lithium anode compositions and electrolytes comprising 1 Molar $LiAsF_6$ in a 50/50 mixture of propylene carbonate and dimethoxyethane. Anode and cathode current collectors in cells of the present invention are most preferably formed from nickel or titanium having thicknesses of about 0.0020 inches. Additionally, hand winding methods for forming a coiled electrode are preferred, as are post-assembly burn-in procedures, where cells are discharged for about 17 hours through a 2.7 kOhm load, followed by a 1.16 Ampere four pulse sequence and open circuit storage for a period of 5.25 days.

Figure 25:
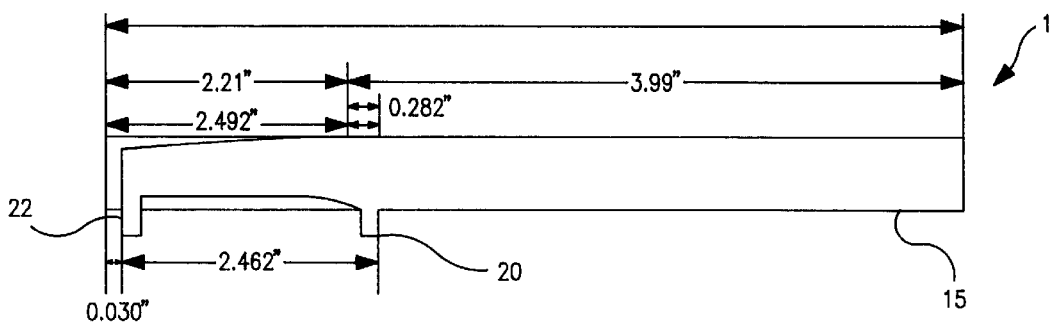
FIG. 25 shows anode assembly 1 made using current collector 5 of FIG. 24.
Figure 26:
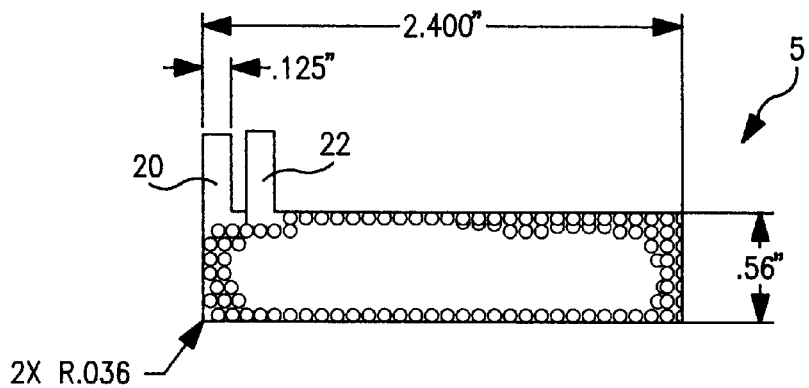
FIG. 26 shows another embodiment of a shortened anode current collector 5 of the present invention having two adjacent connector tabs 20 and 22.
Figure 27:
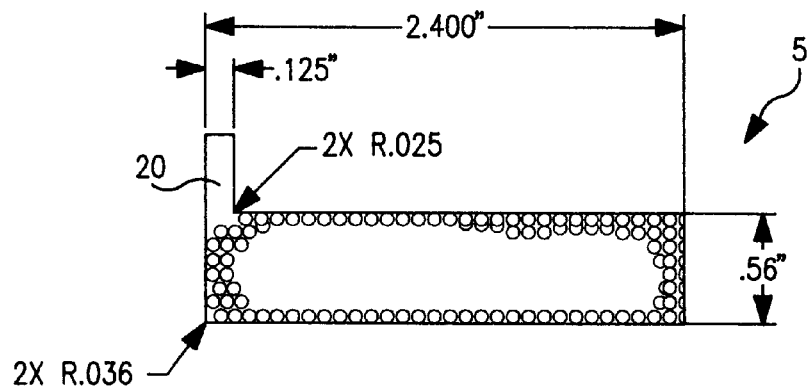
FIG. 27 shows another embodiment of a shortened anode current collector 5 of the present invention having one connector tab 20.
Figure 28:
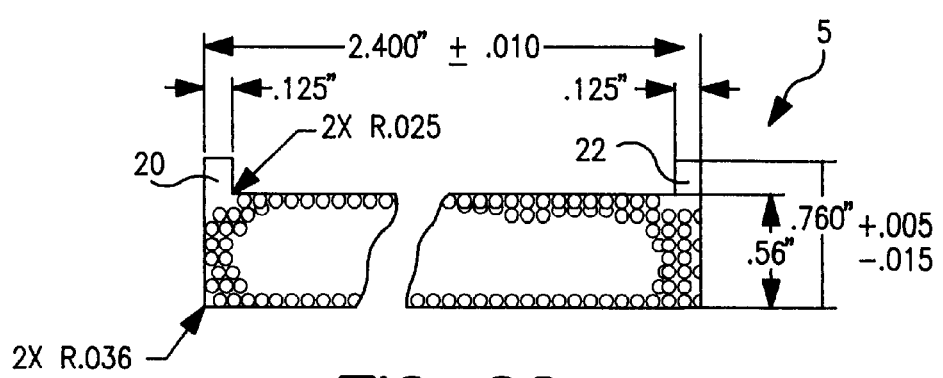
FIG. 28 shows yet another embodiment of a shortened anode current collector 5 of the present invention having a length greater than the anode current collectors shown in FIGS. 24, 26 and 27.
Figure 29:
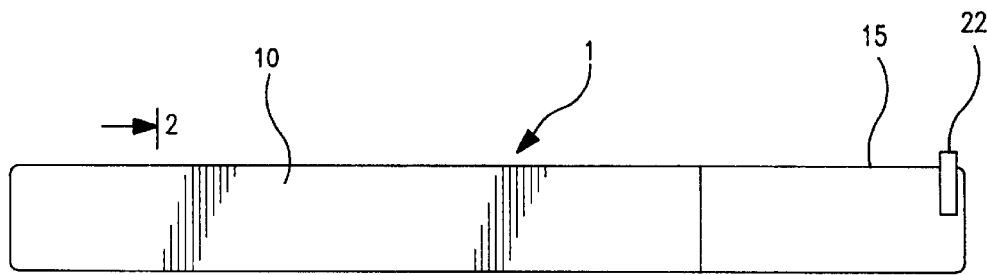
FIGS. 29 through 35 show alternative embodiments of shortened anode current collectors that may be employed in conjunction with the separator of the present invention.
Figure 30:
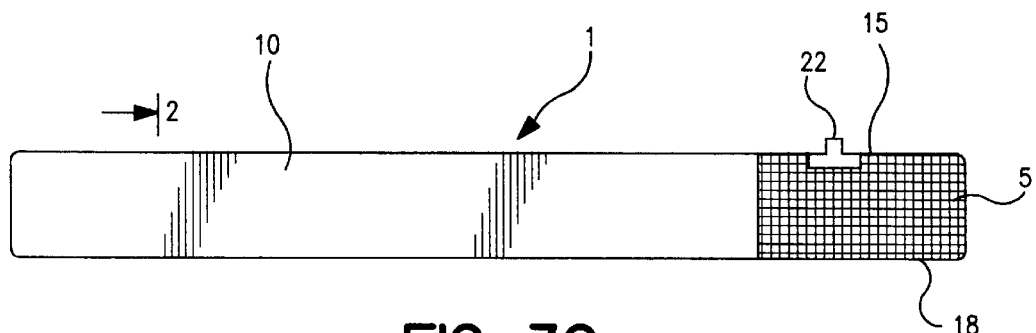
Figure 31:
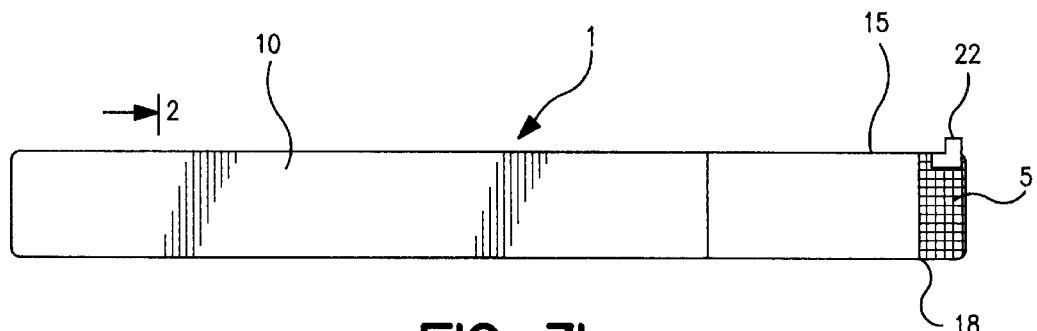
Figure 32:
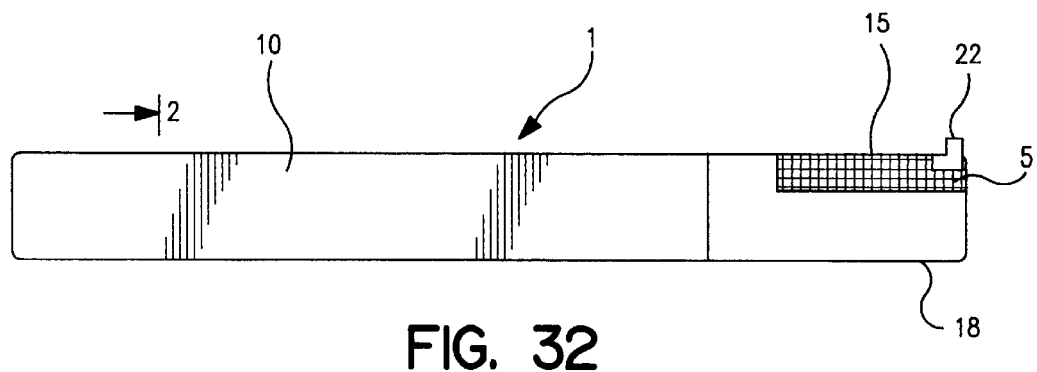
Figure 33:
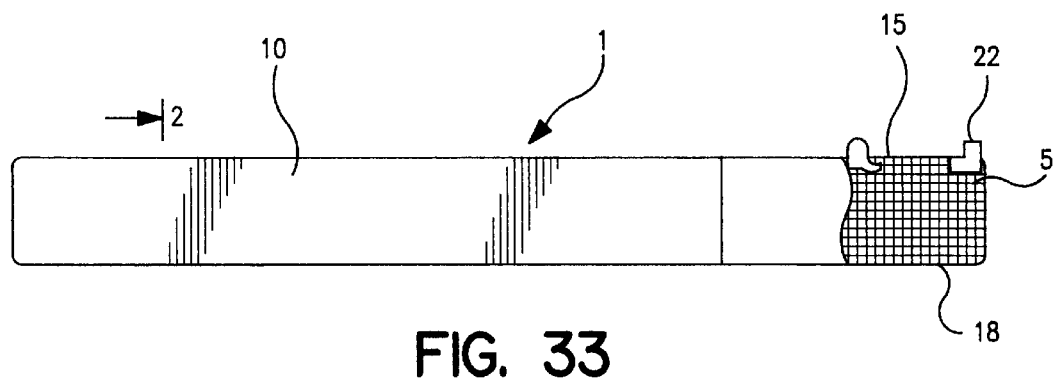
Figure 34:
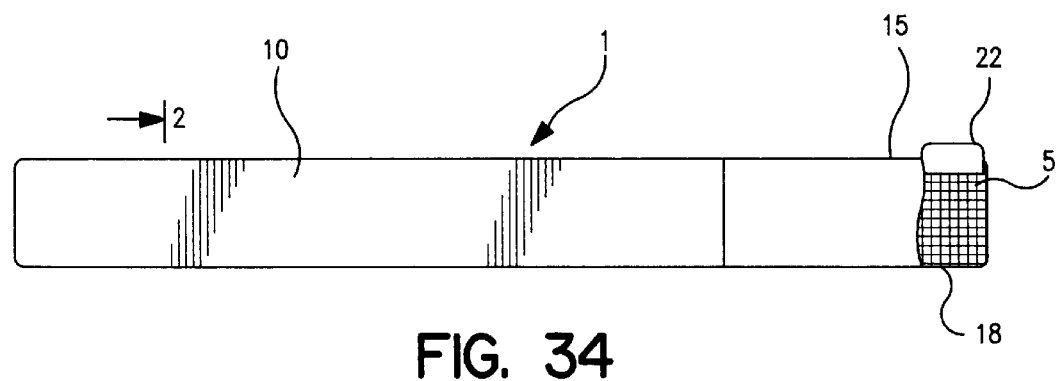
Figure 35:
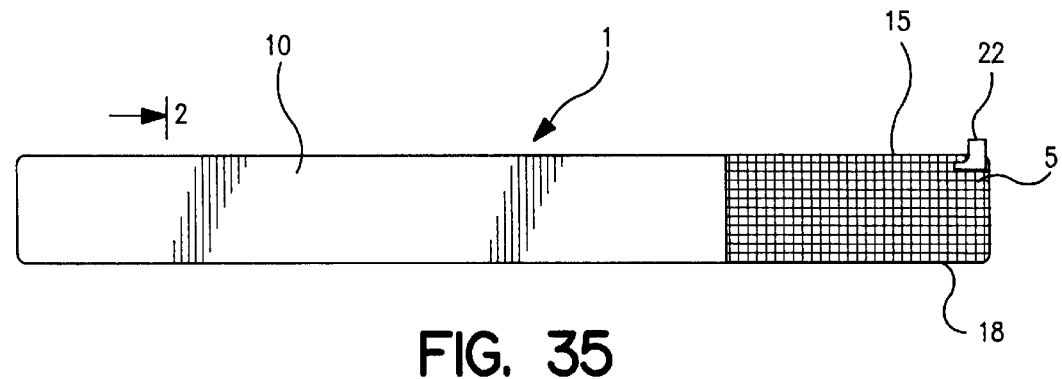

FIG. 25 shows anode assembly 1 made using current collector 5 of FIG. 24. FIG. 26 shows another embodiment of a shortened anode current collector 5 suitable for use in conjunction with the separator of the present invention, where current collector 5 has two adjacent connector tabs 20 and 22. FIG. 27 shows another embodiment of a shortened anode current collector 5 having one connector tab 20. FIG. 28 shows yet another embodiment of a shortened anode current collector 5 suitable for use in conjunction with the separator of the present invention, where current collector 5 has a length greater than the anode current collectors shown in FIGS. 24, 26 and 27. FIGS. 29 through 35 show yet other embodiments of shortened anode current collectors 5 suitable for use in conjunction with various embodiments of the separator of the present invention.

Figure 36A:
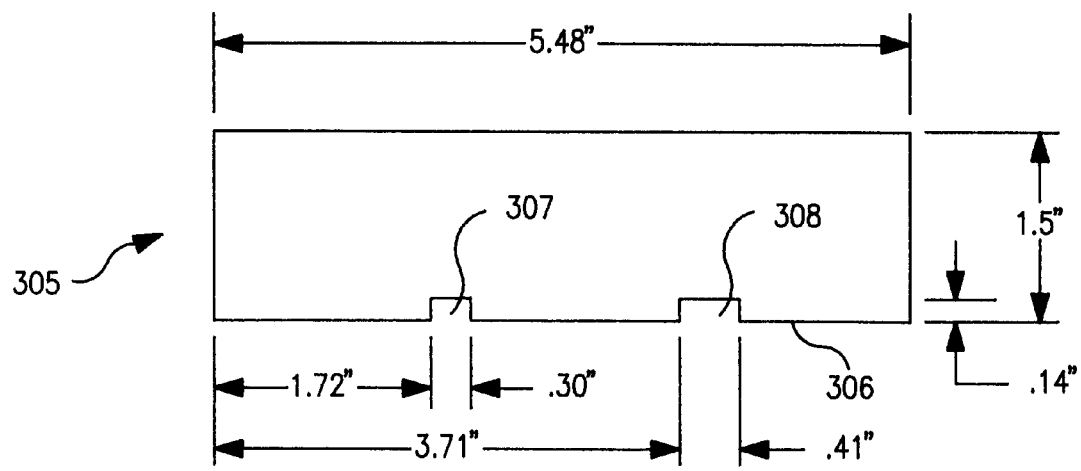
FIG. 36(a) shows slot guide 305 having forming slots 307 and 308 formed therein in accordance with one method of the present invention.
Figure 36B:
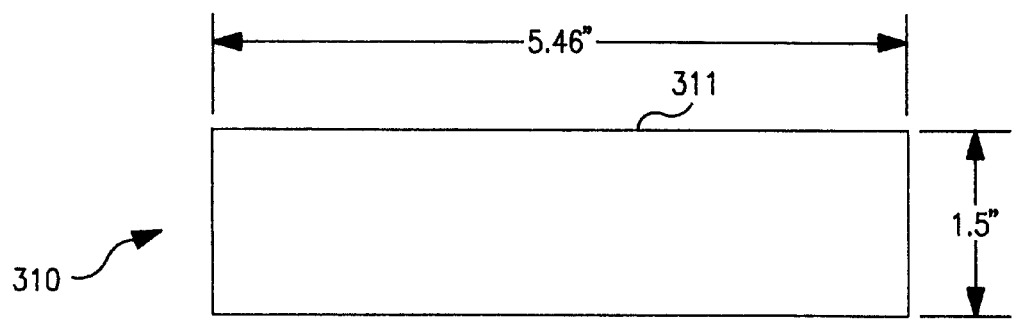
FIG. 36(b) shows separator template 310 in accordance with one method of the present invention.

FIG. 36(*a*) shows slot guide 305 having forming slots 307 and 308 formed therein. Slot guide 305 is most preferably formed of stainless steel 0.020 inches thick and having the other dimensions shown in FIG. 36(*a*). FIG. 36(*b*) shows separator template 310 formed most preferably of stainless steel, having a thickness of about 0.017 inches and having the other dimensions shown in FIG. 36(*b*).

Figure 37:
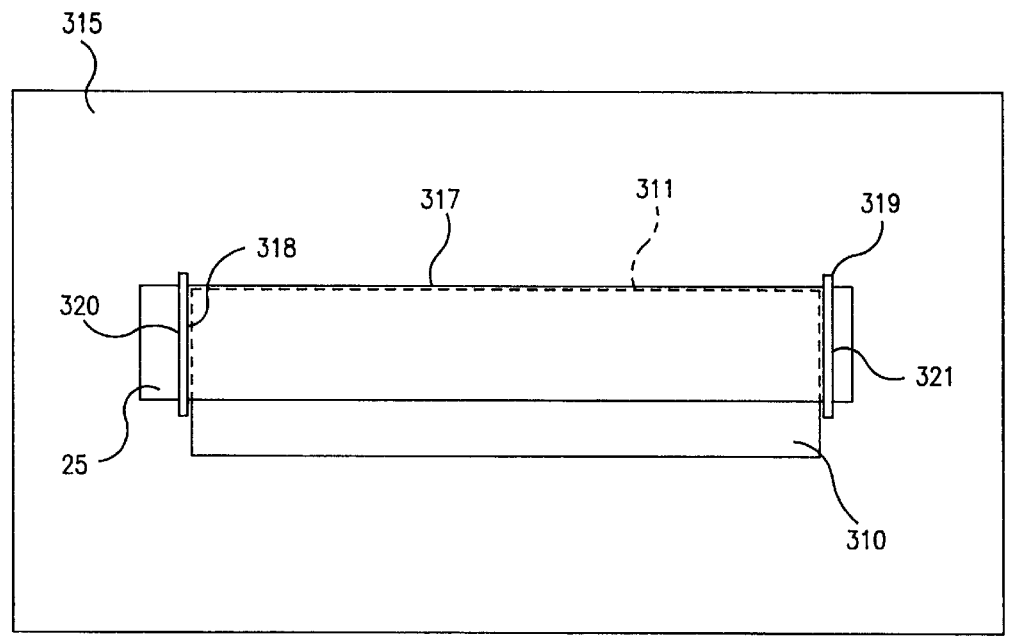
FIG. 37 shows glass plate 315 having separator template 310 and separator 25 disposed thereon in accordance with one method of the present invention.

In one method of making a separator of the present invention, slot guide 305 is taped to glass plate 315 of FIG. 37 using masking tape or the equivalent, and glass plate 315 is placed on a light table. A Weller Soldering Station EC40000 with EC1301 pencil or equivalent is turned on and set to a temperature ranging between about 450 and about 700 degrees F., with a preferred operating temperature of about 575 degrees F. The optimum operating temperature for the soldering iron in the method of the present invention may differ from the foregoing temperatures and temperature range depending on the particular separator material, heat source, fixturing and process speed employed.

Separator 25, most preferably formed from CELGARD® 2500 and having a thickness of about 0.001 inches, is folded over separator template 310 such that the one half of separator 25 is folded over a long side of separator template 310 to form top fold 317 in separator 25. The shiny polymerized side of separator 25 is then most preferably facing outwardly, and separator 25 most preferably lies flat against separator template 310 and is free from wrinkles. The tab slot forming method of the present invention may also be practiced by using CELGARD® 4560 material to form separator 25.

Folded separator 25 and separator template 310 are then placed on glass plate 315, where two ends 318 and 319 of separator 25 are sealed using sealing bars 320 and 321 and the soldering iron (not shown in the Figures); the tip of the soldering iron is drawn along the outward edges of sealing bars 320 and 311. Light projecting through the underside of glass plate 315 aids in aligning sealing bars 320 with the edges of separator template 310. Excess separator material disposed outwardly from sealing bars 320 and 321 is then removed from separator 25 using, for example, a tweezers. Note that the bottom seam of separator 25 is closed after the anode or cathode body and corresponding current collector and at least one tab is placed inside separator 25.

Figure 38:
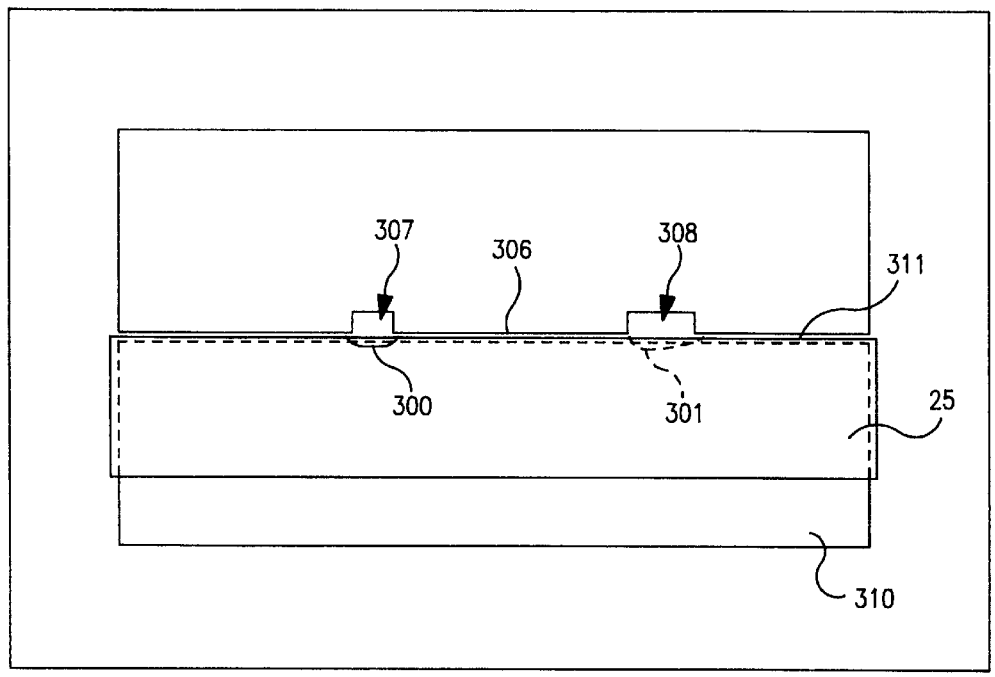
FIG. 38 shows glass plate 315 having separator template 310, slot guide 305 and separator 25 disposed thereon in accordance with one method of the present invention.

Next, separator template 310 and separator 25, still aligned respecting one another such that fold 317 is aligned with upper edge 311 of separator template 310, are both aligned with bottom edge 306 of slot guide 305 on glass plate 315, as shown in FIG. 38. The soldering iron is then employed to form tab slots 300 and 301 in separator 25 by using tab formation slots 307 and 308 to guide and control the position of the tip of the soldering iron during the tab formation process. The tip of the soldering iron is most preferably moved at a speed of about 0.12 inches per second during the tab slot formation process.

As the soldering iron cuts and melts the material from which separator 25 is formed to form tab slots 300 and 301 therein, it is preferred that a bead of polymeric material form about the periphery of the slot as the separator material melts. This bead has been discovered to be helpful in preventing the propagation of any rips, tears or splits that might form in the region of the tab slot in the separator material. This advantage of the thermally-formed tab slots of the present invention has additionally been discovered to find particularly efficacious application in thin separator materials such as CELGARD® 2500.

Next, separator template 310 is removed from finished separator 25, which now forms a "bag" having a folded top edge 317, sealed sides 318 and 319, and thermally-formed tab slots 300 and 301 disposed therein. Sealed areas and slots of separator are then checked for loose strands of separator material, which are most preferably removed. Separator 25 is next most preferably placed in a clean, dry (no more than about 1% relative humidity) storage container and permitted to dry for a minimum of about sixteen hours before use.

Figure 39B:
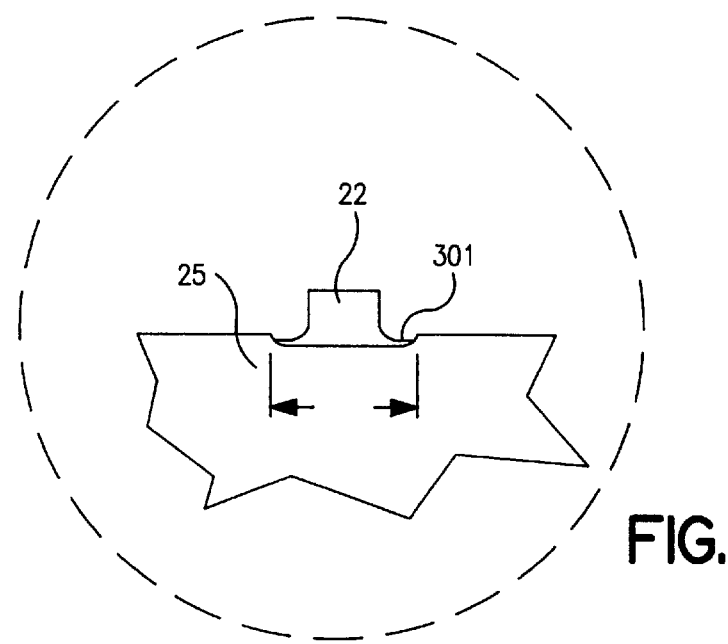
FIG. 39(b) shows an enlarged portion of anode assembly 1 of FIG. 39(a) in accordance with one embodiment of the present invention.
Figure 39A:
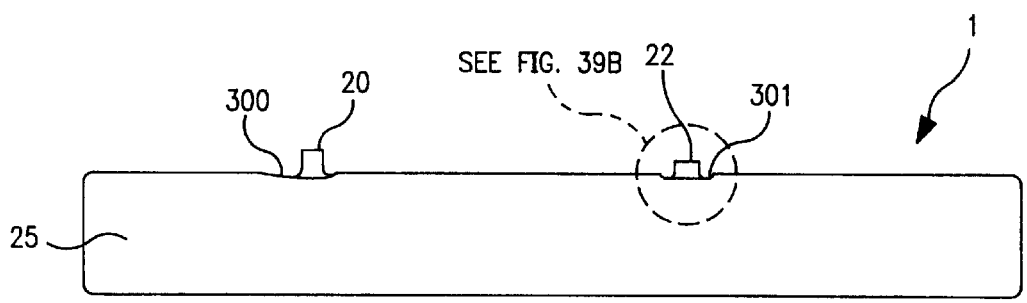
FIG. 39(a) shows separator 25 having thermally formed tab slots 300 of the present invention disposed therein in accordance with one embodiment of the present invention.

FIG. 39(a) shows separator 25 having thermally formed tab slots 300 and 301 of the present invention disposed therein. Separator 25 additionally encloses a strip-shaped anode or cathode body having a current collector embedded therein or thereon to which tabs 20 and 22, for example, are connected. Tabs 20 and 22 project through slots 300 and 301 for connection to a wire, feedthrough or to an external electrical circuit and load. Separator 25 forms a part of anode assembly 1 in FIG. 39(a), but could just as well form a part of cathode assembly 50. FIG. 39(b) shows an enlarged portion of anode assembly 1 of FIG. 39(a) near slot 301.

Slots 300 and 301 may made such that their outer peripheries form oval, elliptical, circular, square, rectangular and other shapes, depending on the specific application at hand. The specific length of the slot also depends on the specific application at hand. The slots may be formed by methods other than by heating with a soldering iron. For example, the heat source employed for forming tab slots 300 or 301 may be a heated stylus, a heated punch or may even be a non-contacting hot air jet, a focused infra-red light and laser beam. Moreover, the thermally formed tab slots of the present invention fund application in such devices as capacitors, and are not necessarily limited to electrochemical cell applications only.

The preceding specific embodiments are illustrative of the practice of the invention. It is to be understood, therefore, that other expedients known to those skilled in the art or disclosed herein, may be employed without departing from the invention or the scope of the appended claims. For example, the present invention is not limited to electrochemical cells having a spirally wound electrode construction. The present invention is also not limited to separators having thermally formed tab slots disposed therein for anodes, but extends to separators having thermally formed tab slots disposed therein for cathodes and their corresponding cathode assemblies. The present invention also includes within its scope separators having thermally formed tab slots disposed therein, where the separators may be formed from varying materials, and may varying thicknesses, stiffnesses, tear characteristics, and strength characteristics from those corresponding to the specific separator materials disclosed hereinabove. The present invention further includes within its scope methods of making and using the separator described hereinabove.

In the Figures, all dimensions shown are merely illustrative, and are not intended to limit the scope of the present invention. In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts a nail and a screw are equivalent structures.

All patents and publications listed hereinabove are hereby incorporated by reference into the specification hereof, each in its respective entirety. As those of ordinary skill in the art will appreciate readily upon reading the Summary of the Invention, Detailed Description of the Preferred Embodiments and Claims set forth herein, at least some of the devices and methods disclosed in those patents may be modified advantageously in accordance with the teachings of the present invention.

I claim:

1. A method of forming connector tab slots in a separator for a spirally wound electrochemical cell having elongated anode and cathode assemblies disposed therein, the separator enveloping and forming a pouch having a top folded edge and first and second ends around one of the anode and cathode assemblies, the anode and cathode assemblies being wound unidirectionally and disposed within an electrically conductive case, the separator being interposed between the anode and cathode assemblies, the method comprising the steps of:

(a) providing material for forming the separator;

(b) providing a separator template having an upper edge;

(c) providing a slot guide having a bottom edge and at least one tab forming slot disposed therein and therealong;

(d) forming a rectangularly-shaped separator sheet from the separator material;

(e) placing the separator sheet on the separator template;

(g) folding the separator sheet over the upper edge of the separator template to form a folded separator sheet having the folded top edge;

(h) aligning the upper edge of the separator template and the folded top edge of the folded separator sheet with the bottom edge of the slot guide; and (f) forming by thermal means a tab slot along the folded edge of the folded separator sheet in the region of the at least one tab forming slot.

2. The method of claim 1, further comprising the step of sealing by thermal means the first and second ends of the separator.

3. The method of claim 1, further comprising the step of placing the separator template, separator sheet and slot guide on a glass plate.

4. The method of claim 1, further comprising the step of selecting the thermal forming means from the group consisting of a soldering iron, a stylus, a punch, a hot air jet apparatus, an infra-red light heating apparatus, and a laser.

5. The method of claim 1, further comprising the step of forming a bead around the periphery of the tab slot while forming the tab slot.

6. The method of claim 1, further comprising the step of disposing an electrode assembly having a connector tab projecting therefrom in the separator such that the connector tab aligns with and projects through the tab slot of the separator.

7. The method of claim 6, wherein the combined electrode assembly and separator are placed in an electrochemical cell.

8. The method of claim 7, wherein the electrochemical cell is placed in and powers at least a portion of an implantable medical device.

* * * * *

UNITED STATES PATENT AND TRADEMARK OFFICE
CERTIFICATE OF CORRECTION

PATENT NO.   : 6,159,253
DATED        : December 12, 2000
INVENTOR(S)  : Jeffrey S. Lund It is certified that error appears in the above-identified patent and that said Letters Patent is hereby corrected as shown below:

Title page,
Item [57] Abstract, "The tab stlots are formed by folding a separator material around a template, aligning the template with a slot guide, and applying heat to the separator material in the region of the slot(s)." This sentence is not found in any Amendments or the Application.

Signed and Sealed this

Thirteenth Day of November, 2001

Attest:

NICHOLAS P. GODICI
*Attesting Officer*  *Acting Director of the United States Patent and Trademark Office*

UNITED STATES PATENT AND TRADEMARK OFFICE
CERTIFICATE OF CORRECTION

PATENT NO. : 6,159,253
DATED : December 12, 2000
INVENTOR(S) : Jeffrey S. Lund

Page 1 of 1

It is certified that error appears in the above-identified patent and that said Letters Patent is hereby corrected as shown below:

Title page,
Item [57], ABSTRACT,
Lines 10-13, please delete "The tab slots are formed by folding a separator material around a template, aligning the template with a slot guide, and applying heat to the separator material in the region of the slot(s)."

Signed and Sealed this

Twenty-sixth Day of October, 2004

JON W. DUDAS
*Director of the United States Patent and Trademark Office*